(12) United States Patent
Inoue (10) Patent No.: US 6,917,989 B1
(45) Date of Patent: Jul. 12, 2005

(54) EXPANSION DEVICE CONNECTED TO INFORMATION DEVICE TO THEREBY EXPAND THE FUNCTIONS THEREOF

(75) Inventor: Naoyuki Inoue, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 235 days.

(21) Appl. No.: 09/625,967

(22) Filed: Jul. 26, 2000

(30) Foreign Application Priority Data

Oct. 29, 1999 (JP) .......................................... 11-309924

(51) Int. Cl.⁷ ................................................ G06F 3/00
(52) U.S. Cl. ............................. 710/2; 710/15; 710/303; 713/340
(58) Field of Search ............................. 710/2, 15, 303; 713/340

(56) References Cited

U.S. PATENT DOCUMENTS

| | | | | |
|---|---|---|---|---|
| 5,132,947 A | * | 7/1992 | Kameda et al. ............ | 369/30.03 |
| 5,698,834 A | * | 12/1997 | Worthington et al. .. | 235/472.03 |
| 5,870,710 A | * | 2/1999 | Ozawa et al. ................ | 704/500 |
| 5,910,933 A | | 6/1999 | Moore | |
| 6,128,263 A | * | 10/2000 | Fujii et al. ................ | 369/47.27 |
| 6,285,091 B1 | * | 9/2001 | Chan et al. .................... | 307/64 |
| 6,357,011 B2 | * | 3/2002 | Gilbert ........................ | 713/300 |
| 6,424,796 B2 | * | 7/2002 | Flannery ..................... | 386/125 |
| 6,456,491 B1 | * | 9/2002 | Flannery et al. ............ | 361/685 |
| 6,480,909 B1 | * | 11/2002 | Chun ........................... | 710/38 |
| 6,633,932 B1 | * | 10/2003 | Bork et al. ................... | 710/72 |

FOREIGN PATENT DOCUMENTS

| | | |
|---|---|---|
| EP | 0-537-525 A2 | 4/1993 |
| EP | 0 689 127 A1 | 12/1995 |
| EP | 0 987 618 A1 | 3/2000 |
| JP | 05-88793 | 4/1993 |
| JP | 07-295685 | 11/1995 |

OTHER PUBLICATIONS

Catalog of FMV BIBLO, Printed on Jul., 1999, Partial Translation of pg. 5, right column of the catalog, Fujitsu Ltd., "Comes with CD-ROM Drive Providing Easy Installation of Software".

Communication enclosing Search Report from the European Patent Office dated Dec. 6, 2004 for Application No. 00 30 6400.

* cited by examiner

Primary Examiner—Jeffrey Gaffin
Assistant Examiner—Eron Sorrell
(74) Attorney, Agent, or Firm—Westerman, Hattori, Daniels & Adrian, LLP (57) ABSTRACT

An expansion device connected to a host device to thereby expand the functions thereof. Even when source power is not supplied from the host device, this expansion device, such as a bay unit, enables reproduction of an audio disk inserted thereinto. The bay unit used by being connected to the host device, in a state in which a recording/reproducing device capable of reproducing digital signals and audio signals is accommodated in a bay, has an operation panel for operating the recording/reproducing device, an audio circuit, which includes an amplifying circuit, a speaker, and a volume control, and a second power input portion to be connected to an existing power supply circuit. Further, source power is supplied thereto from the second power input portion. This enables the recording/reproducing device and the audio circuit to operate even when no source power is supplied from the existing power supply circuit, for example, when the power supply for the host device is turned off, and when the bay unit is disconnected from the host device. A battery incorporated in the bay unit may be connected to the second power input portion.

16 Claims, 5 Drawing Sheets

EXPANSION DEVICE CONNECTED TO INFORMATION DEVICE TO THEREBY EXPAND THE FUNCTIONS THEREOF

BACKGROUND OF THE INVENTION

1. Field of the Invention

The present invention generally relates to an expansion device and, more particularly, to the improvement of an expansion device that is connected to a host device through a cable connection or a connector fitting and that expands the functions of the host device by transmitting a signal, which is read from a data recording medium, to the host device.

2. Description of the Related Art

Information processors such as portable computers, notebook personal computers (hereunder abbreviated to PCs), mobile PCs, laptop PCs, portable digital assistants, portable information processing devices, and portable terminals have become available. When such an information processor is carried by a user, a reduction in size and weight thereof is required. When used on a desk, such an information processor is required to have a wide range of functions. Thus, for example, the size and weight of the main body of a notebook PC must be reduced. Moreover, various expansion units, such as a CD-ROM drive, a floppy disk drive, and a DVD (digital versatile disk), which can be connected to or incorporated into the main body thereof, have been put into practical use.

However, for instance, a CD-ROM drive differs from a high capacity floppy disk drive in structure of a connector for connecting the main body of a notebook PC thereto. Because the notebook PC is downsized and has a small available area for connectors, it is impossible to install a large number of kinds of connectors thereon. Consequently, a limit to the number of kinds of connectors installed in the notebook PC results in a restriction on the kinds of expansion units that can be connected thereto.

Thus, in recent years, a bay unit serving as an expansion device to be used by being connected to a host device, such as the main body of an information device like a PC, has been being put to practical use. This bay unit is used by being connected through a connector to a host device that is an electronic device. Moreover, this bay unit has a main body provided with a slot called a bay. Recording/reproducing devices, for recording information on or reproducing information from data recording media and which have standardized sizes and output terminals, are inserted to this bay.

The recording/reproducing device to be inserted into the bay of the bay unit can be one of various devices, such as a device for recording information on and reproducing information from a static recording medium using flash memory, in addition to a disk drive, such as a CD-ROM drive, a DVD drive, a floppy disk drive, and an MO (magneto-optical) disk drive. This bay unit may be called "an expansion bay housing", "a docking bay", or "a multi-purpose bay".

On the other hand, ordinary CD-ROM and DVD drives are enabled to reproduce data from an audio disk as well as from a data disk. Thus, audio signals to be reproduced as sounds of music can be processed. Consequently, the recording/reproducing device inserted into the bay of the bay unit can read audio signals from an audio disk. Further, the recording/reproducing devices each have a function of outputting analog audio signals in addition to a function of outputting digital data signals. Furthermore, the conventional bay unit can transmit either of a digital data signal and an analog audio signal, which are outputted from a recording/reproducing device, to a host device. The decoding of the digital data signal and the conversion of the analog audio signal are performed in the host device.

Thus, the conventional bay unit is used by being connected to the host device. Therefore, source power is supplied from the host device to the bay unit itself and the recording/reproducing device. There is no need for connecting a power supply to the bay unit. Consequently, when the power supply of the host device is turned off, the recording/reproducing device is simultaneously disabled.

Meanwhile, users of the bay unit demand that, when the power supply for the host device is turned off, the recording/reproducing device can still reproduce audio disk by using only the bay unit, so they can enjoy music recorded on an audio disk. However, in the case of using the conventional bay unit, the reproduction of an audio disk cannot be performed when the power supply for the host device is turned off. Moreover, users have demanded that they can enjoy music recorded on an audio disk by disconnecting the bay unit from the host device and using only the bay unit. The conventional bay unit, however, cannot be used when disconnected from the host device.

SUMMARY OF THE INVENTION

Accordingly, an object of the present invention is to provide an expansion device having a structure by which a source power can be supplied thereto and to a data recording/reproducing device mounted in a mounting portion thereof even when a power supply for a host device connected to an expansion device such as a bay unit is turned off, and even when the expansion device is disconnected from the host device, and by which a user can enjoy music recorded on a storage medium, in which data for reproducing sounds is stored, by only using the expansion device.

To achieve the foregoing object, according to the present invention, there is provided a bay unit, having a main body provided with a mounting portion, in which a readout device is mountable and enabled to read information processing data from a storage medium storing the information processing data and to read sound reproducing data from a storage medium storing at least the sound reproducing data. The bay unit is connected to a host device and used for transmission of data between the host device and the data readout device. The bay unit is characterized by comprising audio circuits for processing the sound reproducing data, a first power input portion for being supplied with source power for the bay unit from a power supply for the host device, and a second power input portion for being supplied with source power for the bay unit from a second power supply other than the power supply for the host device. The bay unit is further characterized in that operations of the audio circuits and the readout device are enabled by supplying source power thereto from the second power input portion when no source power is supplied to the first power input portion.

An operating portion for controlling an operation of the readout device may be provided in the main body of the expansion device. Further, in the expansion device, the mounting portion may selectively and detachably accommodate a plurality of kinds of expansion units other than the readout device. Moreover, the second power supply may be an external DC power supply. Alternatively, the second power supply may be a battery built thereinto.

Incidentally, when no source power is supplied from the first power input portion, the following two cases are considered. One is the case that the expansion device is disconnected from the host device. The other is the case that the expansion device is connected to the host device. Furthermore, the first and second power input portions may mean source power paths in the expansion device.

According to the expansion device of the present invention, the second power input portion connected to this power supply circuit is provided therein in addition to the first power input portion to which source power is supplied from the host device. Thus, operations of the reproducing device and the audio circuit are enabled even when no source power is supplied thereto from the first power input portion, for example, in the case that the power supply for the host device, to which the expansion device is connected, is turned off and in the case that the expansion device is disconnected from the host device.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which.

DETAILED DESCRIPTION OF THE PREFERRED EMBODIMENTS

Hereinafter, the preferred embodiments of the present invention will be described according to practical examples in detail by referring to the accompanying drawings.

Figure 1:
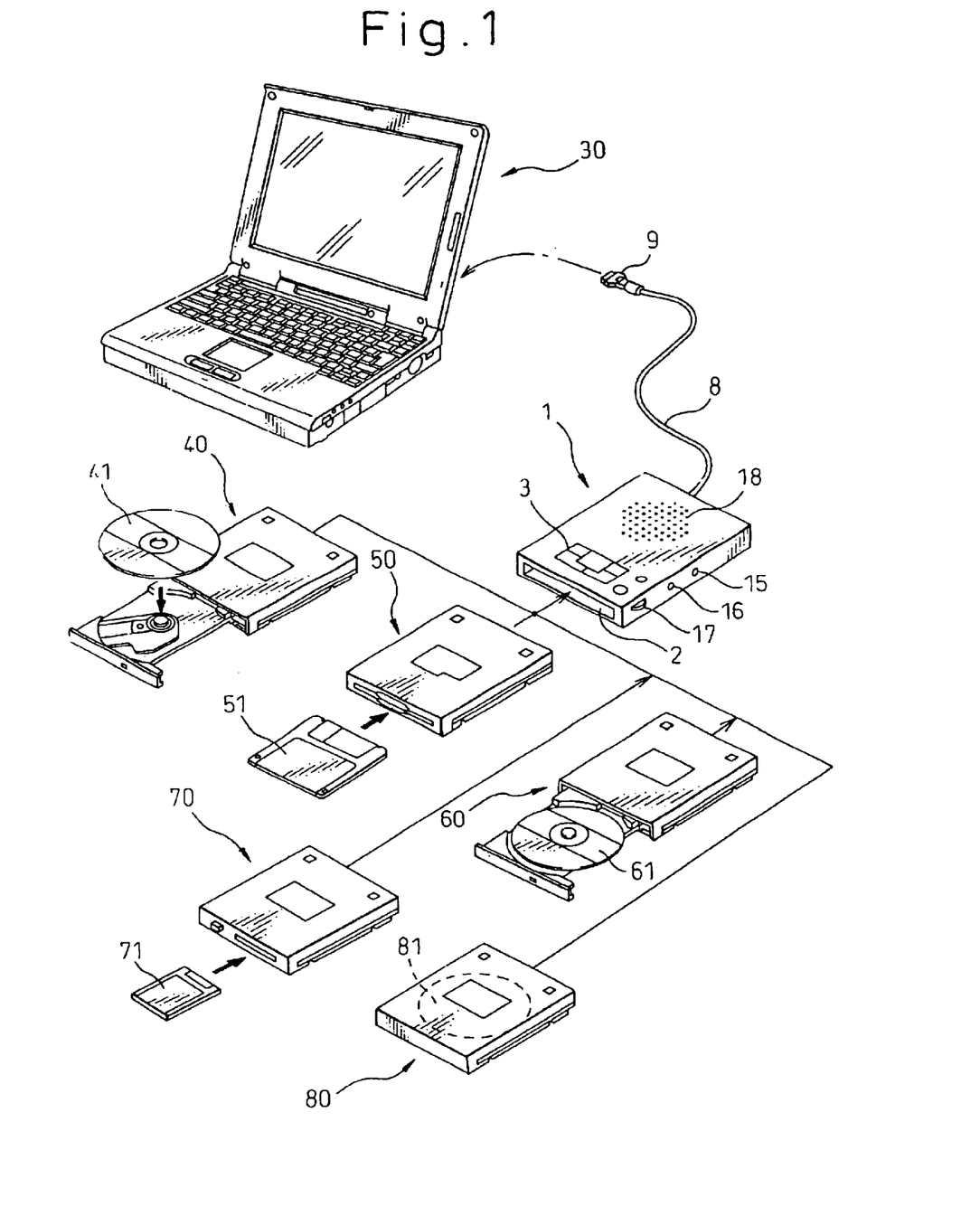
FIG. 1 is a diagram illustrating a situation in which a bay unit embodying an expansion device of the present invention is connected to a PC and in which various media are used by being inserted into the bay unit.

FIG. 1 illustrates a use of a bay unit 1 that is an embodiment of an expansion device of the present invention. This figure shows a notebook PC 30, to which the bay unit 1 is connected, and various recording/reproducing devices (or data readout devices) to be inserted into a bay 2 that is a mounting portion of the bay unit 1. The bay unit 1 is connected to the PC 30 by connecting a connecting cord 8, which has a connector 9 attached to an end portion thereof, to a connector provided on the rear side surface of the PC 30.

The following drives may be employed as a recording/reproducing device to be mounted in the bay 2 of the bay unit 1, that is, a CD-ROM drive 40 for driving a CD-ROM or a CD 41, a floppy disk drive 50 for driving a floppy disk 51, for reading information therefrom and writing information thereto, a DVD drive 60 for driving a DVD 61 and for exchange of data therewith, a memory card drive 70 for exchange of data with a memory card 71 incorporating a flash memory, and a hard disk drive 80 into which a hard disk 81 is built. A connector is provided on the rear side surface of each of these recording/reproducing devices. When the recording/reproducing device is mounted in the bay unit 1, this connector is connected to the connector provided in the bay 2.

Figure 2:
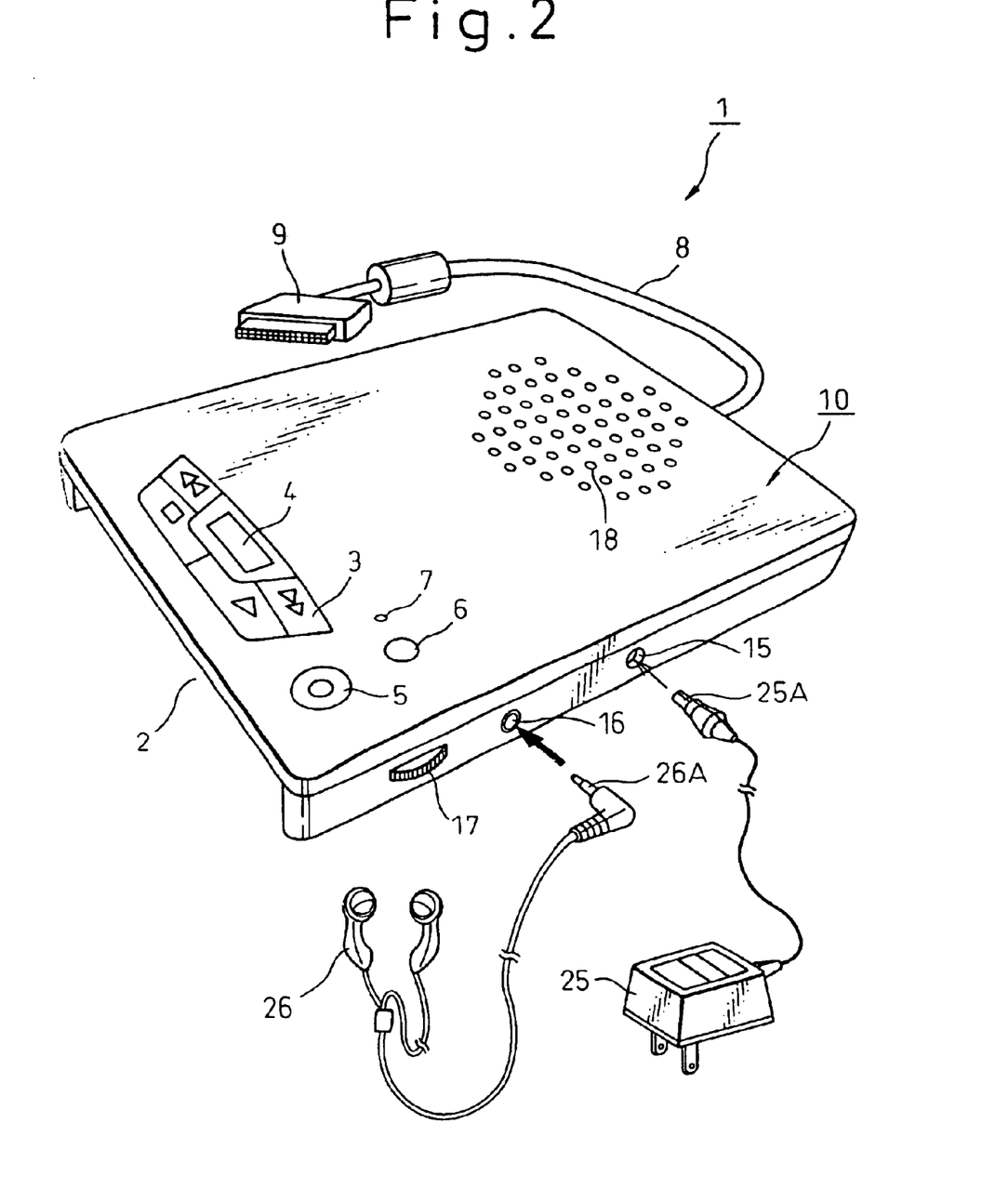
FIG. 2 is a perspective diagram illustrating the appearance of a practical embodiment of the single bay unit of FIG. 1, a headphone, and a power supply adapter.

FIG. 2 illustrates an appearance of a practical embodiment of the bay unit 1 of the present invention, which is shown in FIG. 1. An operation panel 3, a display device 4, a power switch 5, a recording/reproducing device detaching button 6, an operation indicator 7, and a speaker 18 are provided on the top surface of the main body 10 of the bay unit 1 to be connected to a PC by a connecting cable 8 and a connector 9. The operation panel 3 is used to perform operations of playing back, stopping performance, searching forward, and rewinding, for example, when the CD-ROM drive 40, in which a CD that stores music is loaded, is inserted into the bay unit 1. Further, the indicator 4 indicates a currently playing track number, a presently playing piece number, and a playing time. The connecting cord 8 may be adapted to be detached from the main body 10 of the bay unit 1.

Moreover, in this embodiment, when the bay 2 of the main body 10 of the bay unit is viewed from front, an external power supply inlet 15, a headphone jack 16, and a volume control 17 are provided on the right-hand side surface thereof. A plug 25A of an AC adapter 25 is inserted into the external power supply inlet 15. A plug 26A of the headphone 26 is plugged into the headphone jack 16. The volume control 17 is used to control the sound level of a sound radiated from the speaker 18 and that of a sound radiated from the headphone 26 having the plug inserted into the headphone jack 16.

Incidentally, although the bay unit 1 is connected to the notebook PC 30 through the connector 9, which is attached to an end of the connecting cord 8, in the aforementioned embodiment, the bay unit 1 may be connected directly to the notebook PC 30. An example of this is described hereunder by referring to FIGS. 3A and 3B.

Figure 3A:
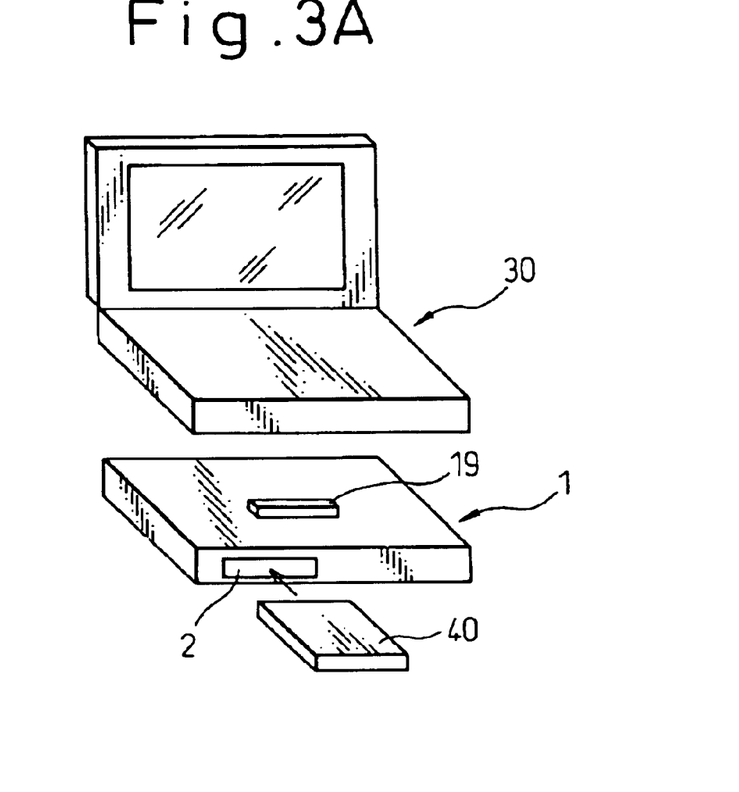
FIG. 3A is a perspective diagram illustrating another example of the connection between the bay unit of the present invention and the PC.
Figure 3B:
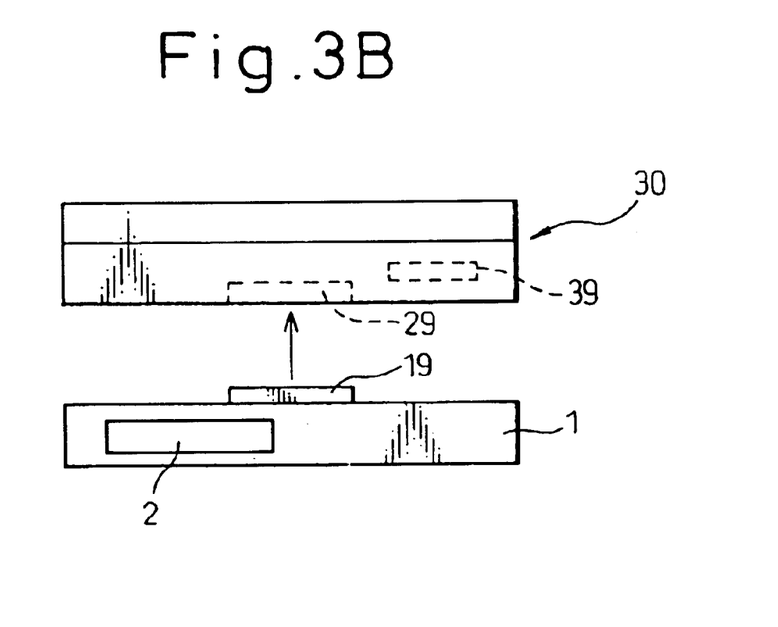
FIG. 3B is a front diagram illustrating an example of the connection between the bay unit shown in FIG. 3A, in which a display portion is closed, and the PC.

In the case of an example illustrated in FIG. 3A, a connector 19 having a terminal similar to that of the connector 9 illustrated in FIGS. 1 and 2 is provided on the top surface of the bay unit 1 having the bay 2, into which the recording/reproducing device 40 is inserted, in such a manner as to protrude therefrom. On the other hand, in the notebook PC 30, a connector 29 is provided in the bottom surface side thereof, as shown in FIG. 3B, in addition to a connector 39 provided on the rear surface side thereof. The bottom-surface-side connector 29 is provided in the PC 30 in such a way as not to project from the bottom surface thereof. In such a case, the connector 19 at the side of the bay unit 1 is connected to the connector 29 at the side of the PC30 only by putting the PC 30 onto the bay unit 1.

Figure 4:
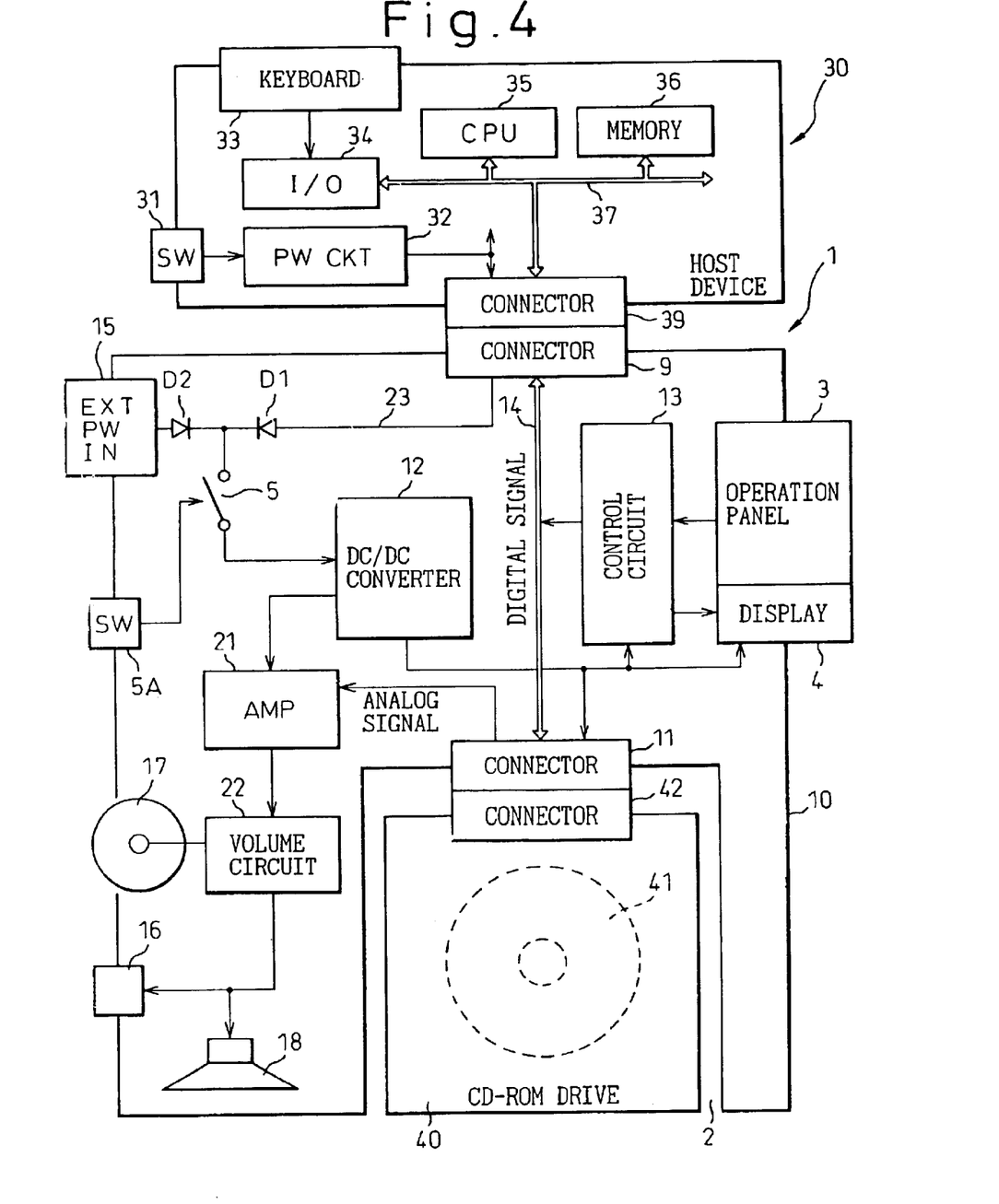
FIG. 4 is a block circuit diagram illustrating a first embodiment of the internal constitution of the bay unit of the present invention.

FIG. 4 shows a first embodiment of the inner constitution of the bay unit 1 of the present invention, which is constituted as described above. The figure illustrates a state in which the bay unit 1 is connected to the PC 30. Incidentally, in the case of this embodiment, the notebook PC 30 has minimum constitution. The illustration of a display panel and a drive circuit therefor is omitted herein. Further, although a connector 39 of the notebook PC 30 is connected directly to the connector 9 of the bay unit 1 in this embodiment, a cable may be provided between the connectors 39 and 9.

The notebook PC 30 has a power supply circuit (abbreviated as "PW CKT" in this figure) 32, which is turned on or off by a power switch 31. This power supply circuit 32 is operative to supply electric power to each part of the main body of the PC 30, and to also supply electric power to the connector 39 connected to the bay unit 1. Moreover, an input/output interface (hereunder abbreviated as I/O) 34, a CPU 35, and a memory 36, such as a ROM or a RAM, are provided in the PC 30, and connected to one another through a bus 37. A keyboard 33 of the PC 30 is connected to the I/O 34. Thus, commands inputted through the keyboard 33, and source power supplied from the power supply circuit 32 are sent to the bay unit 1 through the connector 39.

The bay 2 for the installation of the recording/reproducing device is provided in the bay unit 1 connected to the connector 39 of the PC 30 through the connector 9. Further, a connector 11 to be connected to the connector of the recording/reproducing device inserted in this bay 2 is provided in the inner part of this bay 2. In this embodiment, the CD-ROM drive 40 serving as the recording/reproducing device is installed in the bay 2. The CD-ROM drive 40 is operative to drive and reproduce a CD-ROM or a CD 41 and is connected to the connector 11 provided in the bay 2 through a connector 42.

Incidentally, the CD-ROM drive to be used by the expansion device of the present invention has both of a decoding circuit (not shown) for decoding digital data, and a decoding circuit (not shown) for decoding analog data. When the CD-ROM 41, on which data is recorded, is reproduced, digital data signals are outputted to the connector 42. On the other hand, when the audio CD 41, on which music is recorded, is reproduced, analog music signals are outputted to the connector 42. This embodiment is adapted so that the switching of an output 3, signal between the digital data signal and the analog music signal is automatically performed in the CD-ROM drive 40 serving as the recording/reproducing device.

A bus 14, for instance, an IDE bus 14 for feeding digital signals is connected to the connector 11 of the bay unit 1. The connector 9 for connecting the bay unit 1 to the host device, such as the notebook PC 30, and a control signal 13 are connected to this bus 14. This control circuit 13 is connected to the operation panel 3 and the display device 4. In this embodiment, the control circuit 13 monitors an operating state of each of the buttons provided on the operation panel 3. Thus, the control circuit 13 issues a command corresponding to the depressed button provided on the operation panel 3. This command is sent from the control circuit 13 to the CD-ROM drive 40 through the bus 14 and the connectors 11 and 42. Moreover, the control circuit 13 is enabled to cause the display device 4 to indicate a track number of a currently played track and a piece number of the piece of music presently performed by the CD-ROM drive when the disk 41 is an audio disk.

On the other hand, a power supply line 23 is connected to the connector 9 that is connected to the PC 30. This power supply line 23 is connected to a DC/DC converter 12 through a backflow preventing diode D1 and the power switch 5. This power switch 5 is turned on and off by operating a power control knob 5A. The DC/DC converter 12 is operative to generate a necessary voltage in the bay unit 1. The generated voltage is supplied to the display device 4, the connector 11, the control circuit 13, and an amplifier (abbreviated as AMP in the figure) 21 (to be described later).

According to the present invention, this power supply line 23 is extended and connected to an external power supply inlet (abbreviated as "EXT PW IN" in the figure) 15 attached to the main body 10 of the bay unit 1. This external power supply inlet 15 is connected to the power switch 5 through a backflow preventing diode D2. In the case that source power is connected to both the connector 9 and the external power supply inlet 15, the electric power, which has a higher voltage level, connected to one of the connector 9 and the inlet 15 is connected to the DC/DC converter 12.

This embodiment further comprises an amplifier 21 for amplifying a music signal inputted from the connector 11. The headphone jack 16 and the speaker 18 are connected to this amplifier 21 through a volume control circuit (abbreviated as "VOLUME CIRCUIT" in the figure) 22. The volume control circuit 22 is operative to control the sound level of a sound radiated from the headphone jack 16 or the speaker 18. Incidentally, this embodiment is adapted so that the speaker 18 is not driven when the headphone 26 shown in FIG. 2 is connected to the headphone jack 16.

Hereinafter, various operations of the bay unit 1 of this embodiment constituted as described above will be described.

(1) In the case that the bay unit 1 is connected to the PC 30 and adapted to interchange data:

Then, the power switch 31 of the PC 30 is in an on-state. The power supply circuit 32 supplies source power to each part of the embodiment. Thus, source power is supplied to the bay unit 1 through the connectors 39 and 9. The CD-ROM drive 40 operates on the voltage generated by the DC/DC converter 12. When the CD-ROM 41 is loaded into the CD-ROM drive 40, digital data read from the CD-ROM 41 is sent to the PC 30 through the connectors 42 and 11, the bus 14, and the connectors 9 and 39. Then, the data is processed by the CPU 35 of the PC 30. Further, when an audio CD 41, on which music is recorded, is placed in the CD-ROM 40, similarly, a music signal read from the CD 41 is sent to the PC 30. Then, the audio signal is processed by the CPU 35 of the PC 30. Thus, a sound represented by the audio signal can be outputted from a speaker (not shown) provided at the side of the PC 30. Commands for driving and controlling the CD-ROM drive 40 are inputted from the keyboard 33 of the PC 30.

(2) In the case that the bay unit 1 reproduces an audio CD:

(2-1) When the PC 30 is in an on-state,

Source power is supplied from the PC 30 to the bay unit 1. The voltage generated by the DC/DC converter 12 is supplied to the CD-ROM drive 40 and the amplifier 21. An audio CD 41 is loaded into the CD-ROM drive 40. Audio signals read from the CD 41 are converted by the CD-ROM drive 40 into analog signals that are then outputted to the amplifier 21. The sound level of sounds is controlled by the volume control circuit 22. Thus, music is reproduced from the headphone 16 or the speaker 18. Commands for driving and controlling the CD-ROM drive 40 may be inputted from the keyboard 33 of the PC 30. Alternatively, such commands may be inputted from the operation panel 3 of the bay unit 1. At that time, the display device 4 displays a playing time, a playing track number, and a playing piece number.

(2-2) When the PC 30 is in an off-state, or when the bay unit 1 is separated from the PC30, No source power is supplied from the PC 30 to the bay unit 1. Thus, at that time, the AC adapter 25 shown in FIG. 2 is connected by a user to the external power supply inlet 15 of the bay unit 1. Then, source power is supplied from the AC adapter 25 to the DC/DC converter 12 through the diode D2 and the power switch 5.

Consequently, the voltage generated by the DC/DC converter 12 is supplied to the CD-ROM drive 40 and the amplifier 21. Audio signals read from the audio CD 41, which is loaded into the CD-ROM drive 40, are converted by the CD-ROM drive 40 into analog signals that are then sent to the amplifier 21. The sound level of sounds is controlled by the volume control circuit 22. Thus, music is reproduced from the headphone 26 connected to the headphone jack or from the speaker 18. Commands for driving and controlling the CD-ROM drive 40 are inputted only from the operation panel 3 of the bay unit 1. Similarly, the display device 4 indicates a playing time, a playing track number, or a playing piece number.

Thus, in the case of using the bay unit 1 of the present invention, a user can listen to music by using the bay unit 1 and supplying source power from the exterior to the external power supply inlet 15 regardless of whether or not the power supply for the PC 30 is turned on, or even when the bay unit 1 is disconnected from the PC 30.

Figure 5:
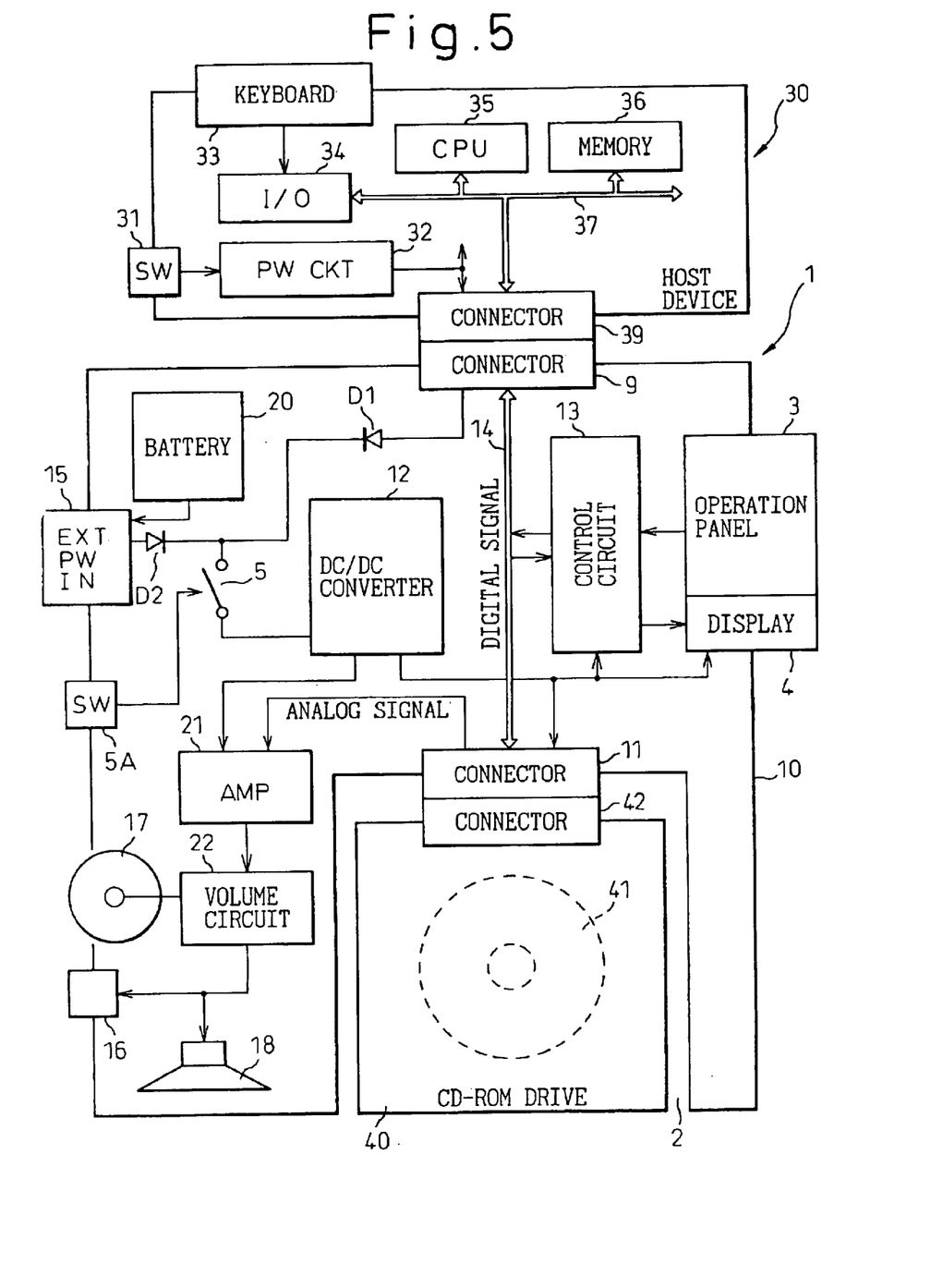
FIG. 5 is a block circuit diagram illustrating a second embodiment of the internal constitution of the bay unit of the present invention.

FIG. 5 is a block circuit diagram showing a second embodiment of the inner constitution of the bay unit 1 of the present invention. The second embodiment differs from the first embodiment only in that a battery 20 is incorporated into the bay unit 1. Thus, in this figure, like reference characters designate like constituent elements of the first and second embodiments. Further, the description of such constituent elements is omitted herein.

In the case of the second embodiment, the battery 20 is incorporated into the bay unit 1. Thus, necessary power for the DC/DC converter 12 can be supplied from the battery 20 without connecting the AC adapter 25 to the external power supply inlet 15. Moreover, the voltage of the battery 20 is set in such a way as to be lower than a voltage supplied to the connector 9. Consequently, when power is supplied to the connector 9, the supply of power from the battery 20 cannot be stopped. Thus, in a state in which the bay unit 1 is disconnected from the PC 30, a user can reproduce the audio CD 41 and listen to music by using the bay unit 1, even where no AC power supply is available.

Incidentally, although it has been described in the foregoing description of the aforementioned embodiment that an audio CD is loaded into a CD-ROM drive serving as a recording/reproducing device for listening to music, a user can listen to music regardless of whether or not the power supply for the PC 30 is turned on, or in a state in which the bay unit 1 is disconnected from the PC 30, in other cases, for example, even in the cases that a DVD containing music and video information is loaded into the DVD drive 60, and that a memory card, on which music is recorded, is inserted into the memory card drive 70.

Incidentally, a chargeable battery may be used as the battery 20 of the second embodiment. Further, the battery 20 of the second embodiment may be adapted so that power is not supplied to the converter 12 when the AC adapter 25 is connected to the external power supply inlet 15. Furthermore, although the external power supply inlet 15 is provided in addition to the connector, to which power is supplied from the host device, in the case of the aforementioned embodiments, the external power supply inlet 15 may be used in common as the connector 9.

As described above, in the case of the expansion device of the present invention, separate from the existing power supply circuit to which power is supplied from the host device, the second power supply circuit connected to the existing power supply circuit is additionally provided therein. Consequently, even in the case that no power is supplied to the expansion device from the existing power supply circuit, for example, when the power supply for the host device, to which the expansion device is connected, is turned off, and when the expansion device is disconnected from the host device, the recording/reproducing device and the audio circuit can operate, so that a user can listen to music.

Although the preferred embodiments of the present invention have been described above, it should be understood that the present invention is not limited thereto and that other modifications will be apparent to those skilled in the art without departing from the spirit of the invention.

The scope of the present invention, therefore, should be determined solely by the appended claims.

What is claimed is:

1. An expansion device used for transmission of data between a computer and a readout device, comprising:
   a main body connect to said computer;
   a mounting portion provided on said main body in which said readout device is mountable, said readout device being able to read information processing data from a storage medium storing the information processing data and to read sound producing data from a storage unit storing at least the sound reproducing data;
   audio circuits for processing the sound reproducing data;
   a first power input portion being supplied with source power for said expansion device from a power supply for said computer;
   a second power input portion being supplied with source power for said expansion device from a second power supply other than said power supply for said computer; and
   a DC/DC converter connected to the mounting portion and to the audio circuits,
   wherein operations of said audio circuits and said readout device awe enabled by supplying source power to the DC/DC converter from said second power input portion when said second power input portion has a higher voltage level than said first power input portion and supplying source power to the DC/DC converter from the first power input portion when said first power input portion has a higher voltage level than said second power input portion.

2. The expansion device according to claim 1, wherein an operating portion for controlling an operation of said readout device is provided in said main body.

3. The expansion device according to claim 1, wherein said mounting portion is adapted to selectively and detachably accommodate a plurality of kinds of expansion units other than said readout device.

4. The expansion device according to claim 3, wherein said plurality of kinds of expansion units are a CD-ROM drive, a floppy disk drive, a DVD drive, a memory card drive, and a hard disc drive.

5. The expansion device according to claim 4, wherein said CD-ROM drive has both a decoding circuit for decoding digital data and a decoding circuit for decoding analog data and wherein switching between a digital data signal and an analog music signal is automatically performed according to a kind of said storage medium.

6. The expansion device according to claim 5, wherein said readout device indicates a playing track number and a piece number in a display device of said operating portion when said storage medium is an audio disk.

7. The expansion device according to claim 1, wherein said second power supply is an external DC power supply.

8. The expansion device according to claim 1, wherein said second power supply is a battery built thereinto.

9. The expansion device according to claim 8, wherein a voltage of said battery is set in such a way as to be lower than a power supply voltage to be supplied to said first power input portion.

10. The expansion device according to claim 8, wherein said battery is a chargeable battery.

11. The expansion device according to claim 1, wherein said computer is a notebook personal computer.

12. The expansion device according to claim 1, wherein said computer is connected to said expansion device by a cable.

13. The expansion device according to claim 12, wherein said cable is detachable from said expansion device in the case that no source power is supplied to said first power input portion.

14. The expansion device according to claim 1, wherein said computer is connected to said expansion device by connecting a connector provided in said computer directly to a connector provided on said expansion device.

15. The expansion device according to claim 1, wherein a connector is installed in said mounting portion provided in said main body, wherein a corresponding connector is provided in said readout device, and wherein said readout device is connected to said main body only by inserting said readout device into said mounting portion.

16. The expansion device according to claim 1, wherein said second power input portion is provided in said first power input portion.

* * * * *